United States Patent
Zhang et al.

(10) Patent No.: US 8,098,425 B2
(45) Date of Patent: Jan. 17, 2012

(54) FIBER COMMUNICATION SYSTEM, FIBER AMPLIFIER, AND METHOD FOR FABRICATING FIBER AMPLIFIER

(75) Inventors: Wendou Zhang, Shenzhen (CN); Dongming Li, Shenzhen (CN); Hong Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 302 days.

(21) Appl. No.: 12/417,947

(22) Filed: Apr. 3, 2009

(65) Prior Publication Data

US 2009/0190934 A1   Jul. 30, 2009

Related U.S. Application Data

(63) Continuation of application No. PCT/CN2007/071339, filed on Dec. 26, 2007.

(30) Foreign Application Priority Data

Dec. 31, 2006  (CN) .......................... 2006 1 0063869

(51) Int. Cl.
*H01S 3/00* (2006.01)
(52) U.S. Cl. ............................... 359/341.3; 359/341.32
(58) Field of Classification Search ............... 359/341.3, 359/341.32
See application file for complete search history.

(56) References Cited

U.S. PATENT DOCUMENTS

| | | | |
|---|---|---|---|
| 5,125,066 A | | 6/1992 | Ishiguro et al. |
| 5,355,249 A | * | 10/1994 | Souda et al. ............... 359/341.1 |
| 5,457,558 A | * | 10/1995 | Yokoyama ..................... 398/181 |
| 5,694,238 A | | 12/1997 | Lausen et al. |
| 5,812,307 A | * | 9/1998 | Naganuma ................. 359/341.1 |
| 6,115,178 A | * | 9/2000 | Naganuma et al. ...... 359/485.03 |
| 6,236,497 B1 | * | 5/2001 | Andersen et al. .......... 359/337.1 |
| 6,310,717 B1 | * | 10/2001 | Naganuma et al. ........ 359/341.1 |
| 6,452,717 B1 | | 9/2002 | Endo |
| 2003/0133181 A1 | * | 7/2003 | Gao ........................... 359/341.3 |

FOREIGN PATENT DOCUMENTS

| | | |
|---|---|---|
| CN | 1181647 A | 5/1998 |
| CN | 1452328 A | 10/2003 |
| CN | 1720647 A | 1/2006 |
| CN | 1749838 A | 3/2006 |

(Continued)

OTHER PUBLICATIONS

European Search Report for Application No. 07846165.4, dated Oct. 2, 2009, 6 pages.

(Continued)

*Primary Examiner* — Mark Hellner

(74) *Attorney, Agent, or Firm* — Finnegan, Henderson, Farabow, Garret & Dunner LLP

(57) ABSTRACT

The present invention discloses a fiber amplifier, a fabricating method thereof, and a fiber communication system. The fiber amplifier includes at least a pump laser, at least a gain medium and at least an integrated optical component. The integrated optical component includes multiple optical input/output ports, and the optical input/output ports are connected to the pump laser or gain medium directly or indirectly. The present invention may better address problems of unstable performance and difficulty in reducing the size of components in the prior art where fiber amplifiers are formed by a number of discrete components with many fiber fusion splices. In addition, the present invention may reduce the production complexity and costs of fiber amplifiers, and improve the productivity of fiber amplifiers.

11 Claims, 8 Drawing Sheets

FOREIGN PATENT DOCUMENTS

| | | |
|---|---|---|
| CN | 1856914 A | 11/2006 |
| CN | 101211087 B | 8/2011 |
| EP | 0 651 475 A2 | 2/1994 |
| EP | 1 569 308 A1 | 2/2003 |
| JP | 05 341232 A | 12/1993 |
| JP | 05 343785 A | 12/1993 |
| JP | 8-88430 | 4/1996 |

OTHER PUBLICATIONS

International Search Report from P.R. China in International Application No. PCT/CN2007/071339 mailed Apr. 3, 2008.

Written Opinion of the International Searching Authority (translation) dated (mailed) Apr. 3, 2008, issued in related Application No. PCT/CN2007/071339, filed Dec. 26, 2007, Huawei Technologies Co., Ltd.

First Chinese Office Action dated (mailed) May 8, 2009, issued in related Chinese Application No. 200610063869.6 Huawei Technologies Co., Ltd.

\* cited by examiner

FIBER COMMUNICATION SYSTEM, FIBER AMPLIFIER, AND METHOD FOR FABRICATING FIBER AMPLIFIER

This application is a continuation of international application number PCT/CN2007/071339, filed on Dec. 26, 2007, which claims a priority from Chinese Patent Application No. 200610063869.6, filed with the Chinese Patent Office on Dec. 31, 2006, and entitled "Fiber Communication System, Fiber Amplifier, and Method for Fabricating Fiber Amplifier", the contents of both of which are incorporated herein by reference in their entirety.

TECHNICAL FIELD

The present invention relates to fiber communication technologies, and in particular, to a fiber amplifier, a fabricating method thereof, and a fiber communication system.

BACKGROUND

A fiber communication system may be categorized into single wavelength fiber communication systems and wavelength division multiplexing fiber communication systems according to the number of optical signals used to provide the carried services.

FIG. 1 shows a typical structure of a single wavelength fiber communication system. A transmitter, TX, transmits signal light with the wavelength of $\lambda$, and the signal light is input to a fiber amplifier at the transmitting end, which amplifies the power of the signal light. Upon amplification, the signal light is transmitted in a transmission fiber. Because the transmission fiber has signal losses, the signal light transmitted in the transmission fiber is lost gradually. The signal light is then amplified by a fiber amplifier at the receiving end, and received by a receiver, RX.

The wavelength division multiplexing technology is a communication technology in which optical signals of multiple wavelengths are transmitted in a same fiber. FIG. 2 shows a typical structure of a wavelength division multiplexing fiber communication system. As shown in FIG. 2, transmitters TX1, TX2, TX3, ..., TXn transmit signal lights with wavelengths of $\lambda 1, \lambda 2, \lambda 3, \ldots, \lambda n$, respectively. The signal lights with different wavelengths are coupled by a wavelength division multiplexer and transmitted in a same fiber. The signal light is input to a fiber amplifier, which amplifies the power of the signal light. Upon amplification, the signal light is transmitted in a transmission fiber; because the transmission fiber has signal losses, the signal light transmitted in the transmission fiber is lost gradually. The signal light is then amplified by a next fiber amplifier. This process continues until the signal light with wavelengths of $\lambda 1, \lambda 2, \lambda 3, \ldots, \lambda n$ is split and transmitted to different output ports, and received by receivers RX1, RX2, RX3, ..., RXn.

It can be seen that the fiber amplifier in a fiber communication system amplifies the power of the signal light, compensates the signal loss, and plays the role of a repeater. The fiber amplifier technology has developed rapidly. Fiber amplifiers with different structures and performances are already designed to meet different application requirements. Existing fiber amplifiers include erbium doped fiber amplifier, praseodymium doped fiber amplifier, thulium doped fiber amplifier, and Raman fiber amplifier.

Fiber amplifiers with different structures and performances are composed of gain medium, pump source, and input/output coupling structure. According to different gain media, the existing fiber amplifiers are categorized into two types: one type adopts active media, for example, erbium doped fiber amplifier, and the other type is based on the non-linear effect of the fiber, for example, Raman fiber amplifier.

With the fast development of fiber communication networks, there are increasing demands for the fiber communication equipment, and system operators have higher requirements for the integration of the fiber communication equipment. The fiber amplifier, as an important component of the fiber communication equipment, is developing towards small size and high integration. The existing fiber amplifiers are generally formed by discrete optical components or hybrid low-integrated components under an inline package based on the existing discrete component package technology. Because the integration is based on one dimension, the number of integrated components is generally less than three but no greater than four. Due to limitation of the package form and size of the components, it is difficult to shrink the size of the fiber amplifier.

For example, the erbium doped fiber amplifier (EDFA) adopts an erbium doped fiber (EDF) as the gain medium. Inside the EDFA, an optical connector, an optical splitter, an optical isolator, an optical wavelength multiplexer, an EDF, a gain flattening filter, a pump laser, and an optical detector are connected through fiber splicing. FIG. 3 shows a typical structure of an EDFA optical channel, where adding or removing some components may implement different functions or performances.

The conventional technical solution has the following weaknesses:

1. The fiber amplifier needs multiple active components and passive components. The size of the fiber amplifier is very difficult to reduce due to some factors, such as the large number and size of components, large number of fiber fusion splices and difficulty in fiber winding.

2. The passive components have large losses, and there are many fiber fusion splices. The accumulated losses hinder the optimization of the output power and noise coefficient of the fiber amplifier.

3. Optical passive and active components must undergo a complex package process, requiring high costs.

The fiber amplifier requires a complex production process, long processing duration, and high manufacturing costs.

4. The discrete components are combined.

The optical energy passes through multiple components and there are many optical fusion splices between the components. This may reduce the reliability of the fiber amplifier. In particular, a high power fiber amplifier has strict quality requirements for fiber fusion splices. The failure of fiber fusion spices is a main cause for the failure of the fiber amplifier. Too many fiber fusion splices may directly affect the reliability of the fiber amplifier.

SUMMARY

Embodiments of the present invention provide a fiber amplifier, a fabricating method thereof, and a fiber communication system to solve the problems in the prior art where fiber amplifiers are formed by a number of discrete components with many fiber fusion splices, including difficulty in fabricating a fiber amplifier, difficulty in shrinking the size of the fiber amplifier, and high costs.

The objective of the present invention is achieved through the following technical solution:

A fiber amplifier provided in some embodiments may include at least a pump laser, at least a gain medium, and at least an integrated optical component, where the integrated optical component may include multiple optical input/output ports. The optical input/output ports are connected to the pump laser or gain medium directly or indirectly.

A method for fabricating a fiber amplifier provided in some embodiments may include:

combining multiple optical components into an integrated optical component; and combining the integrated optical component, a pump laser and a gain medium into a fiber amplifier.

A fiber communication system provided in some embodiments may include at least an optical transmitter, at least an optical receiver, at least a transmission fiber, and a fiber amplifier, where:

the optical transmitter is adapted to transmit optical signals;

the optical receiver is adapted to receive optical signals;

the transmission fiber is adapted to carry optical signals; and the fiber amplifier is adapted to amplify the optical signals carried in the transmission fiber, and includes at least a pump laser, at least a gain medium, and at least an integrated optical component, where the integrated optical component includes multiple optical input/output ports. The optical input/output ports are connected to the pump laser or gain medium directly or indirectly.

It can be seen from the technical solution provided in the disclosed embodiments that a free space integrated optical component may be used to form a fiber amplifier. Compared with the solution in the prior art where fiber amplifiers are formed by discrete components, this technical solution has the following merits:

1. Multiple optical components may be integrated into a small-size component through the free space integration technology, and the number of integrated function units is not limited. Compared with discrete components, this saves necessary parts such as encapsulating parts and fiber collimators for some discrete components, thus reducing the size of the component. In addition, the fiber outlet can be designed flexibly in the free space integrated optical component, which can reduce the area of fiber winding. For example, a reflective structure may be designed so that the fiber can be led out in the same direction. Therefore, the fiber amplifier using the free space integrated optical component may be designed in a more compact structure.

2. Using the free space integrated component may save optical components such as encapsulating parts and fiber collimators. This also saves the process of encapsulating some components, thus lowering the costs of the components. In addition, using the integrated component in a fiber amplifier facilitates the assembly and reduces the number of fiber fusion splices, thus improving the productivity of the fiber amplifier. Therefore, the material and manufacturing costs of the fiber amplifier that uses the free space integrated optical component may be reduced, and the production cycle may be shortened.

3. Compared with the combination of discrete components, the free space integrated optical component reduces the collimator coupling times, thus reducing losses of the components. In addition, the free space integrated optical component reduces the number of fiber fusion splices, thus reducing the accumulated splicing loss and optical energy loss. This may increase the output power of the fiber amplifier and reduce the noise coefficient.

4. Compared with the combination of discrete components, the free space integrated optical component may reduce the number of components through which the optical energy passes and the number of fusion splices, thus improving the reliability of the fiber amplifier. Generally, the failure of fiber fusion splices is a main cause for the failure of a high power fiber amplifier. Thus, using the free space integrated optical component in a high power fiber amplifier may enhance the reliability.

DETAILED DESCRIPTION OF THE EMBODIMENTS

The first embodiment of the present invention provides a fiber amplifier and a fabricating method thereof, in which a free space integration technology is used to integrate optical components to form a compact fiber amplifier. The free space integration technology is used to assemble and integrate various optical components on a two-dimensional or three-dimensional optical platform, and control the direction of propagation of a beam in the free space according to reflection, transmittance, or refraction principles. The beam in the free space may be processed by various optical components when it passes through the optical components, and may be propagated in multiple dimensions in the space, and the light may be propagated out of the medium waveguide.

The free space integrated optical component integrates multiple optical components by using the free space integration technology, including: optical splitter, optical isolator, optical wavelength division multiplexer, optical detector, optical attenuator, optical filter, polarization beam combiner, optical reflector, optical circulator, optical switch, and/or optical modulator.

The embodiments consistent with the present invention are hereinafter described in detail with reference to disclosed embodiments and accompanying drawings.

Figure 4:
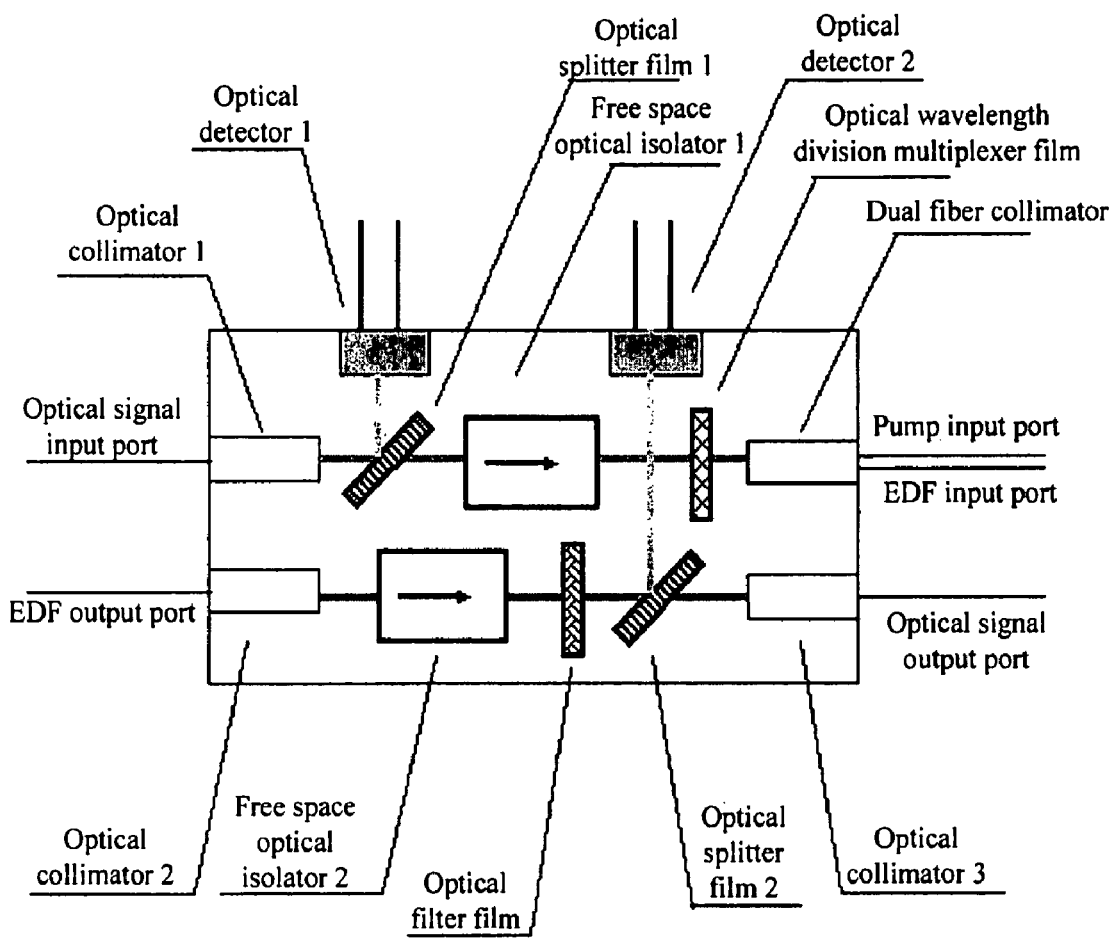
FIG. 4 shows an exemplary structure of a free space integrated optical component according to some embodiments of the present invention.

As shown in FIG. 4, the fiber collimators 1, 2 and 3, dual fiber collimator, optical splitter (optical splitter film 1 and optical splitter film 2), optical detectors 1 and 2, optical isolator (free space optical isolators 1 and 2), optical wavelength division multiplexer (optical wavelength division multiplexer film), and optical filter (optical filter film) are integrated on a two-dimensional optical substrate through the free space integration technology, and the integrated component is fixed and encapsulated in a metal box to form a free space integrated optical component. The method for integrating multiple optical components by using the free space integration technology provided in some embodiments is described below:

First, the optical components at the front end of the EDF are integrated. For example, integration may include, fixing the fiber collimator 1 and the dual fiber collimator at a specified position, adjusting the position and angle of the fiber collimator 1 and the dual fiber collimator to ensure that the loss from the optical signal input port to the EDF input port reaches an expected range, and fixing the dual fiber collimator. Integration may also include, placing the optical wavelength division multiplexer film at a specified position, detecting the optical loss from the pump input port to the EDF input port, adjusting the position and angle of the optical wavelength division multiplexer film to ensure that the optical loss from the pump input port to the EDF input port reaches an expected range, adjusting the position of the fiber collimator 1 to ensure that the loss from the optical signal input port to the EDF input port reaches an expected range, and fixing the optical wavelength division multiplexer film on a two-dimensional optical plane. Additional steps may include, placing the free space optical isolator 1 at a specified position on the two-dimensional optical substrate, adjusting the position and angle of the free space optical isolator 1 to ensure that the loss from the optical signal input port to the EDF input port reaches an expected range, and fixing the free space optical isolator 1. Placing the optical splitter film 1 at a specified position, adjusting the position and angle of the optical splitter film 1 and the position of the fiber collimator 1 to ensure that the loss from the optical signal input port to the EDF input port reaches an expected range, and that the reflected light reaches an expected direction, and that the energies of the reflected light and the transmitted light are in an expected proportion, and fixing the optical splitter film 1 on the two-dimensional optical substrate may also be performed. Additional steps may further include, placing the optical detector 1 at a specified position, adjusting the position of the optical detector 1 to ensure that signals reflected by the optical splitter 1 are all received by the optical detector 1, and fixing the optical detector 1 on the two-dimensional optical substrate; fixing the fiber collimator 1 on the two-dimensional optical substrate.

Then, the optical components at the back end of the EDF are integrated. For example, integration may include, fixing the fiber collimator 2 and the fiber collimator 3 at a specified position, adjusting the positions and angles of the fiber collimator 2 and the fiber collimator 3 to ensure that the loss from the EDF output port to the optical signal output port reaches an expected range, and fixing the fiber collimator 2. Integration may also include, placing the free space optical isolator 2 at a specified position, detecting the loss from the EDF output port to the optical signal output port, adjusting the position and angle of the free space optical isolator 2 to ensure that the loss from the EDF output port to the optical signal output port reaches an expected range, and fixing the free space optical isolator 2 on the two-dimensional optical plane. Additional steps may include, placing the optical filter film at a specified position on the two-dimensional optical substrate, adjusting the position and angle of the optical filter film and the position of the fiber collimator 3 to ensure that the loss from the EDF output port to the optical signal output port meets an expected requirement, and fixing the optical filter film. Placing the optical splitter film 2 at a specified position, adjusting the position and angle of the optical splitter film 2 and the position of the fiber collimator 3 to ensure that the loss from the EDF output port to the optical signal output port meets an expected requirement, and that the reflected light reaches an expected direction, and that energies of the reflected light and the transmitted light are in an expected proportion, and fixing the optical splitter film 2 on the two-dimensional optical substrate may also be performed. Additional steps may further include, fixing the fiber collimator 3 on the two-dimensional optical substrate.

As shown in FIG. 4, the free space integrated optical component has five fiber ports: an optical signal input port, adapted to input optical signals to be amplified; a pump optical input port, adapted to input the pump light output from a pump laser; an active medium input port (also the EDF input port in the figure); an active medium output port (also the EDF output port in the figure), adapted to connect to the gain medium; and an optical signal output port, adapted to output the amplified optical signals.

The free space integrated optical component is adapted to multiplex pump light and signal light in at least one channel, detect input/output optical division and power, and isolate an inverse amplified spontaneous emission (ASE) noise, in which the integrated optical components are fixed on a two-dimensional optical platform. Functions of each optical component are described as follows:

The fiber collimator is adapted to convert the light propagated in a fiber into parallel light propagated in the free space or couple the parallel light propagated in the free space into the fiber for propagation.

The optical splitter film is adapted to split the beam energy by a certain proportion.

The optical filter film is a gain flattening filter film, and is a wavelength related loss film. The gain curve of the EDF is related to the wavelength. The gain flattening filter film is adapted to balance gains of signals with different wavelengths.

The free space optical isolator is adapted to prevent noise light that is propagated in an inverse direction.

The optical wavelength division multiplexer film is adapted to combine or split lights with different wavelengths.

The optical detector is adapted to detect the optical power.

In the free space integrated optical component provided in the first embodiment, the optical channel is divided into two parts:

Part 1: Some optical components at the front end of the EDF, not including the pump laser, are combined in the EDFA. The propagation mode of the signal light in the free space integrated optical component is as follows: The signal light is input from the signal light input port of a fiber, and enters the air medium after it is converted into a parallel beam through the fiber collimator 1. The parallel beam passes through an optical splitter film 1, and the optical splitter film 1 reflects some light to the optical detector 1 to detect the input optical power of the fiber amplifier, and the light transmitted through the optical splitter film continues to be propagated. The transmitted light continues to be propagated through the free space optical isolator 1 and is further transmitted through an optical wavelength division multiplexer film. The transmitted light continues to be propagated and enters a dual fiber collimator; and after entering the dual fiber collimator, the parallel beam is focused and coupled into the EDF input port of the fiber for output.

The propagation mode of the pump light in the free space integrated optical component is as follows: The pump light is input from the pump input port of another fiber at the dual fiber collimator, and is converted into a parallel beam after it passes through the collimator. The parallel beam is reflected back to the dual fiber collimator by the optical wavelength division multiplexer film, and is coupled into the EDF input port of the fiber for output.

Part 2: Some optical components at the back end of the EDF are combined in the EDFA. The amplified signal light in the EDF is input at the EDF output port, and enters the air medium after it is converted into a parallel beam through the fiber collimator 2. The parallel beam passes through the free space optical isolator 2 and a gain flattening filter film (also the optical filter film). An optical splitter film reflects some signal light to the optical detector 2 to detect the output power of the fiber amplifier. The light transmitted through the optical splitter film continues to be propagated and enters the fiber collimator 3. The parallel beam that enters the fiber collimator 3 is focused in the fiber collimator 3 and coupled into the optical signal output port of the fiber for output.

Figure 5:
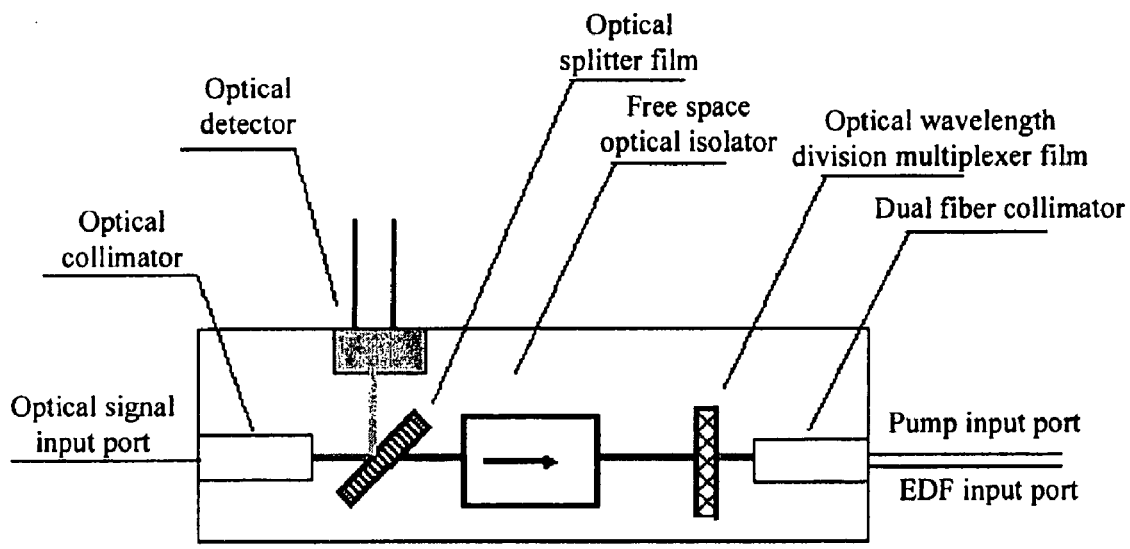
FIG. 5 shows an exemplary integration of optical components in the front end of the erbium doped fiber (EDF) of the free space integrated optical component according to some embodiments of the present invention.
Figure 6:
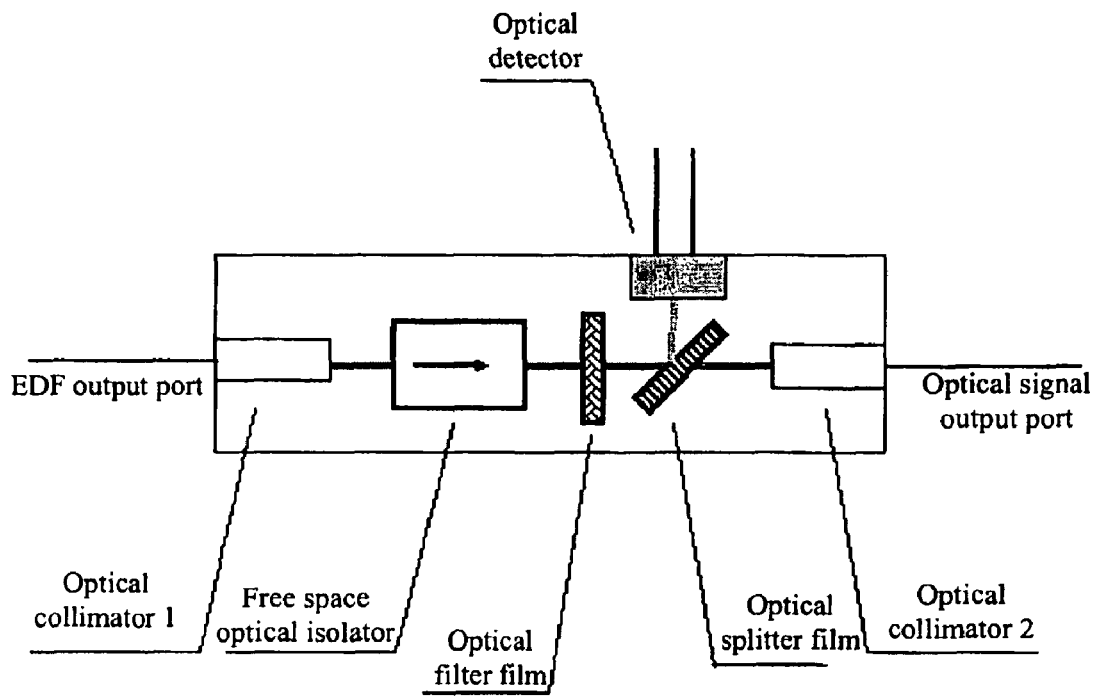
FIG. 6 shows an exemplary integration of optical components in the back end of the EDF of the free space integrated optical component according to some embodiments of the present invention.

The free space integration technology may be used to integrate the optical channels at the front and back ends of the EDF in the preceding embodiment, as shown in FIG. 5 and FIG. 6.

Figure 7:
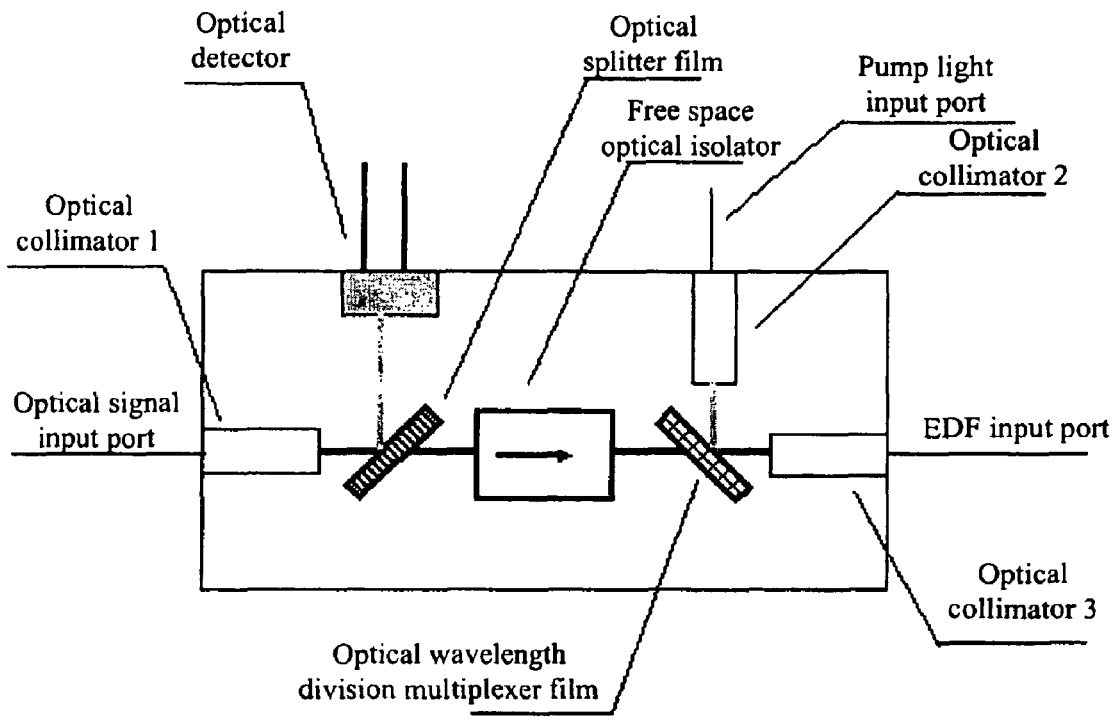
FIG. 7 shows an exemplary replacement of a dual fiber collimator with a single fiber collimator in the free space integrated optical component according to some embodiments of the present invention.
Figure 8:
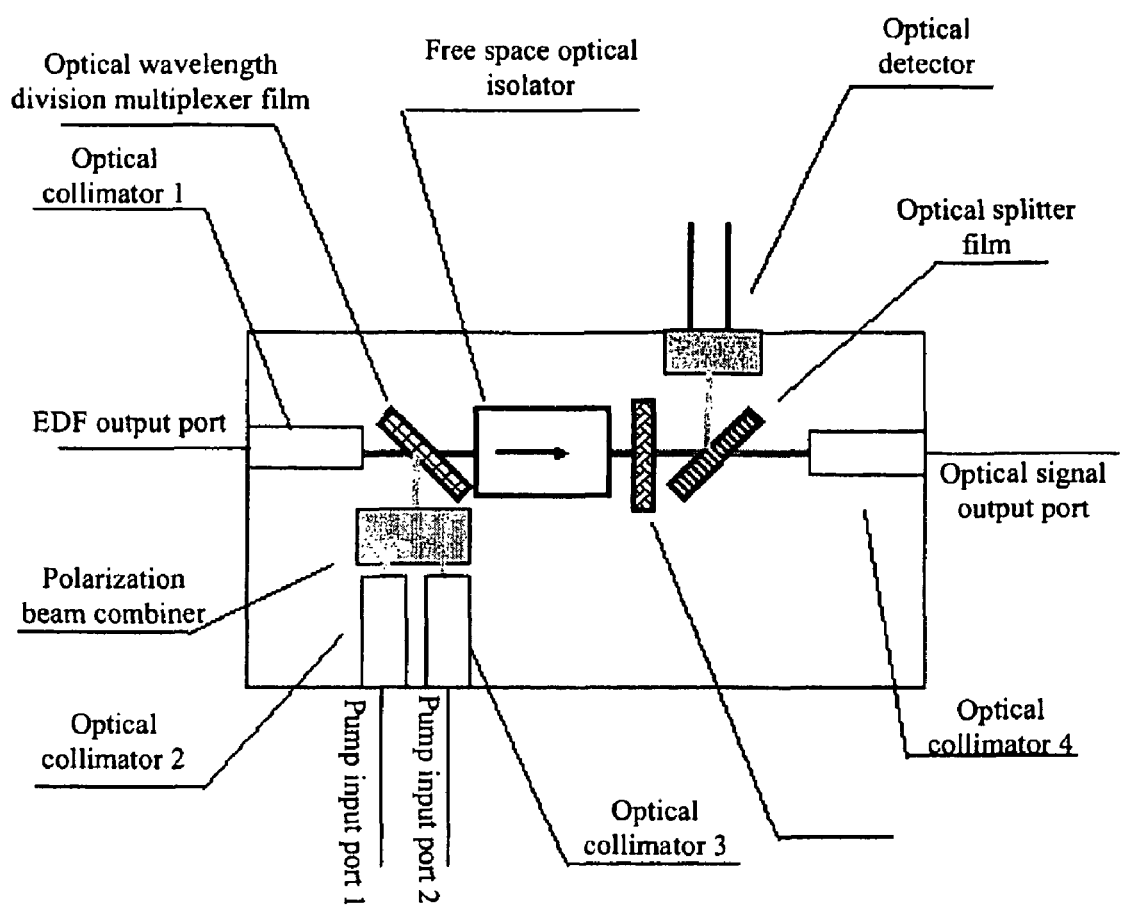
FIG. 8 shows an exemplary integration of a polarization beam combiner in the free space integrated optical component according to some embodiments of the present invention.
Figure 9:
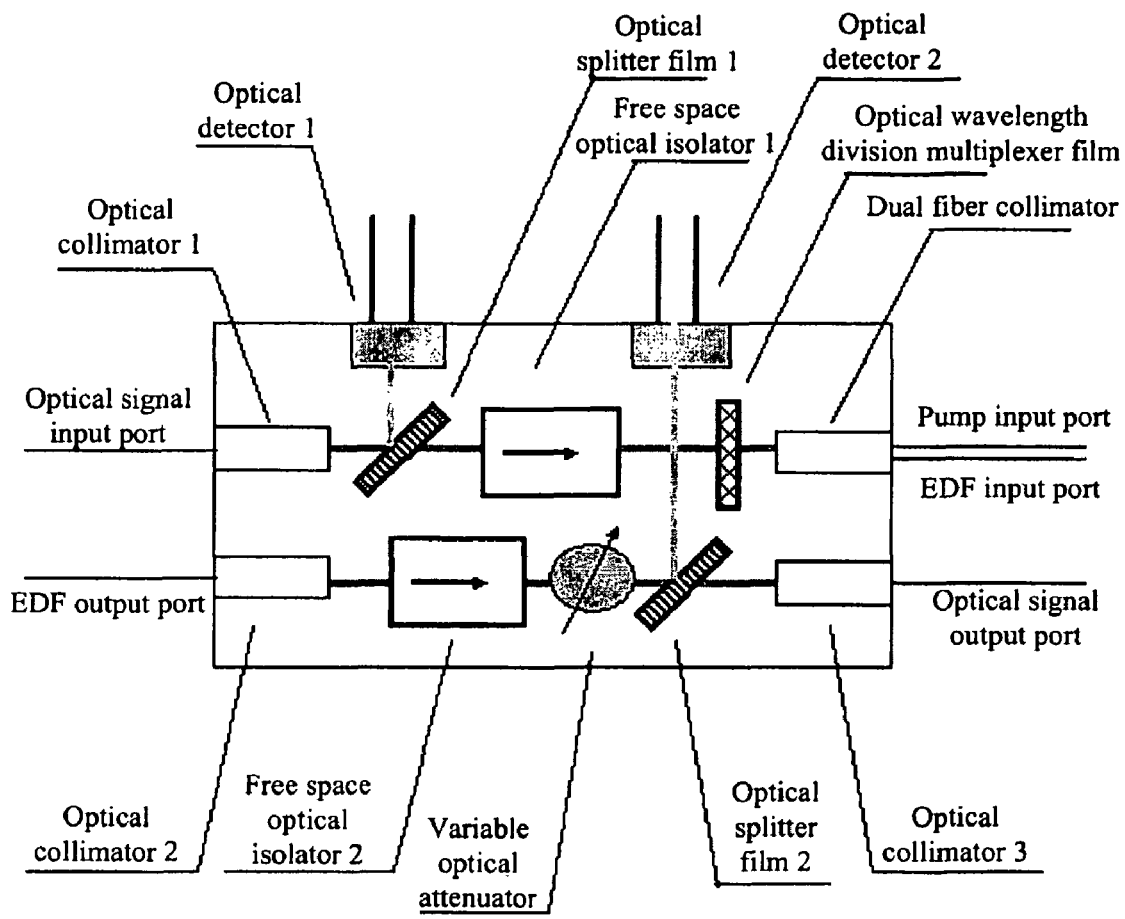
FIG. 9 shows an exemplary integration of a variable optical attenuator in the free space integrated optical component according to some embodiments of the present invention.

The dual fiber collimator in the preceding embodiment may be replaced with two single fiber collimators, as shown in FIG. 7. A polarization beam combiner may be integrated in the free space integrated optical component to combine the pump light in two channels and meet the application requirement for higher output power of the fiber amplifier, as shown in FIG. 8. In addition, a variable attenuator may be integrated in the free space integrated optical component to support the fiber amplifier in implementing variable output power, as shown in FIG. 9.

Figure 10:
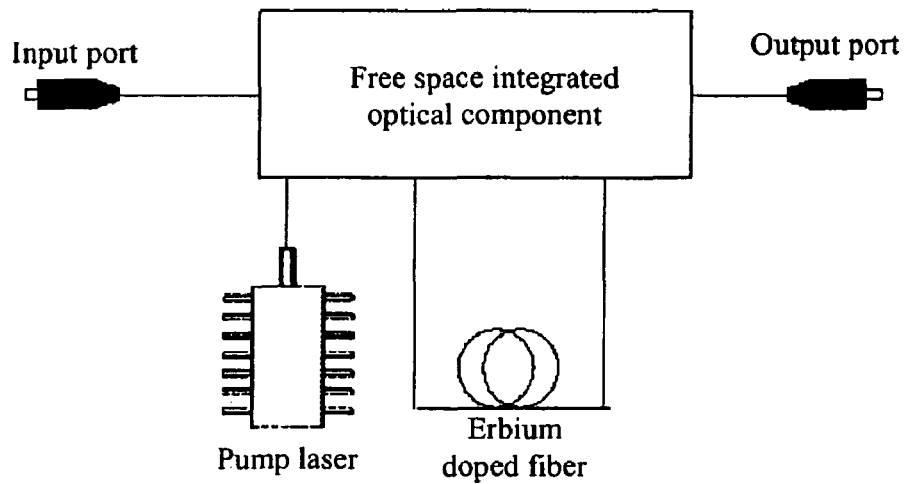
FIG. 10 shows an exemplary structure of the fiber amplifier according to some embodiments of the present invention.
Figure 11:
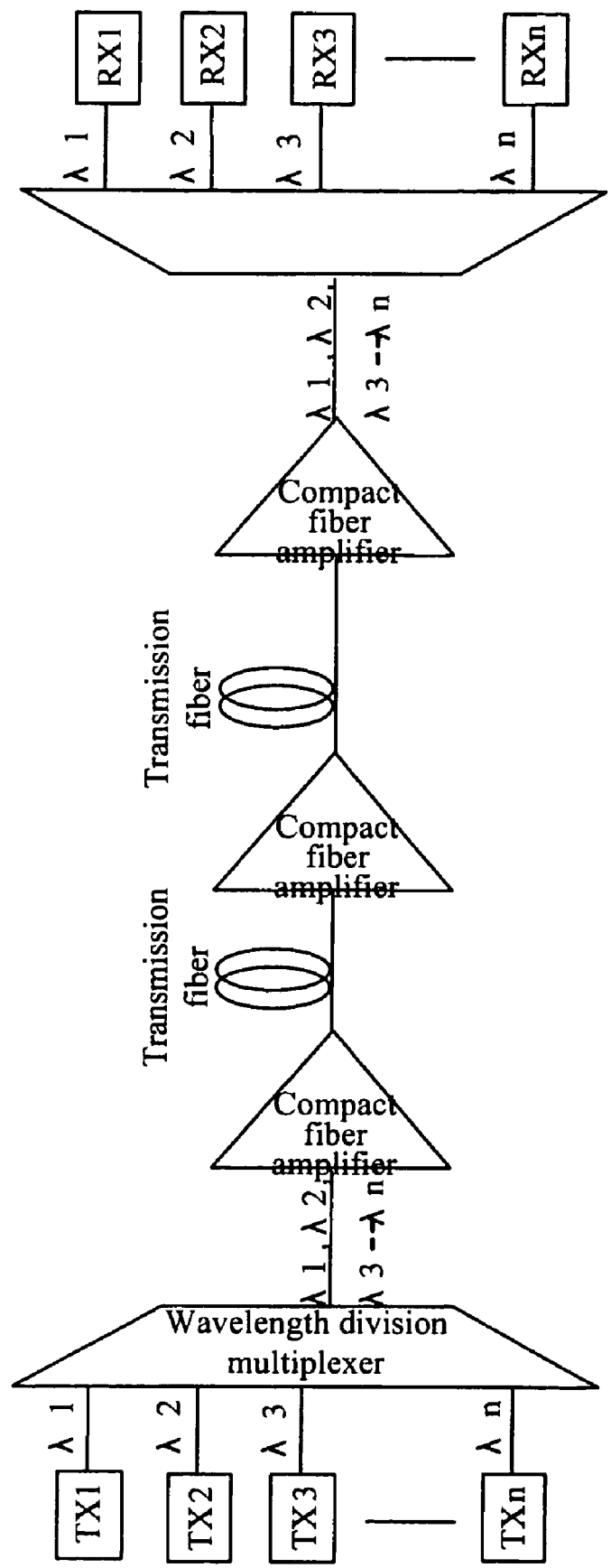
FIG. 11 shows an exemplary structure of the fiber communication system according to some embodiments of the present invention.

FIG. 10 shows a fiber amplifier formed by the free space integrated optical component shown in the first embodiment, where the fiber amplifier includes a free space integrated optical component, a gain medium (the EDF in this embodiment) and at least a pump laser. The pump laser is connected to the free space integrated optical component through a pump input port of the free space integrated optical component, and inputs pump light through the pump input port. The EDF is connected to the free space integrated optical component through an EDF input port of the free space integrated optical component, and inputs optical signals through the EDF input port. The other end of the EDF is connected to the EDF output port. The pump laser may include but is not limited to a 980 nm band pump laser and/or a 1480 nm band pump laser.

The above are preferred embodiments of the present invention only. In practical applications, the fiber amplifier may be designed flexibly according to function and performance requirements. For example, repeated function units may be added to integrate multiple fiber amplifier units into one fiber amplifier, or EDF levels and related optical components may be added to implement different gains, or the gain medium may be changed to amplify optical signals of different bands. The free space integrated optical component may also be integrated flexibly. For example, repeated optical function units may be added to the free space integrated optical component to meet application requirements of multiple fiber amplifiers, or related optical components may be added to meet requirements of an optical amplifier with multiple EDF levels, or optical components of different bands may be changed to meet requirements for amplifying optical signals of different bands.

Figure 1:
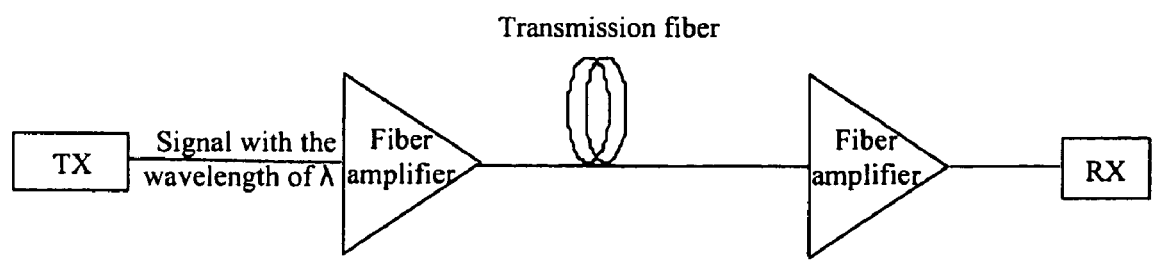
FIG. 1 shows a typical structure of a single wavelength fiber communication system in the prior art.
Figure 2:
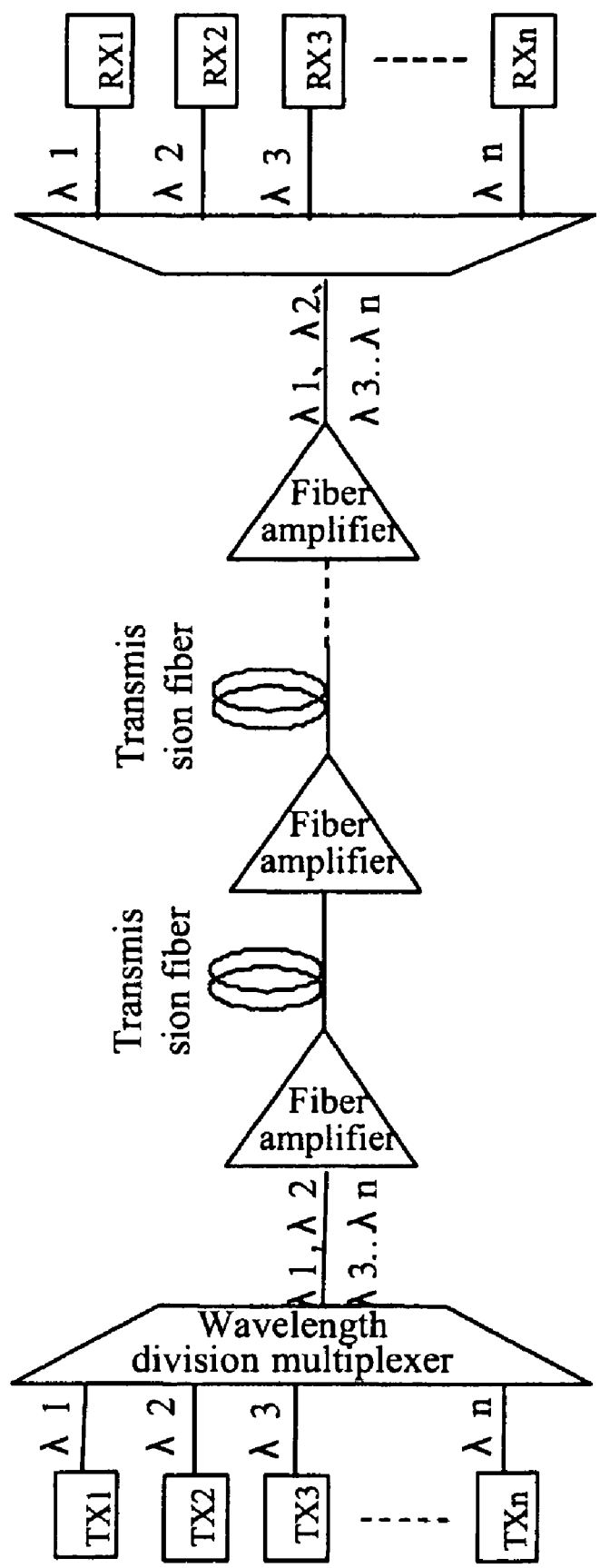
FIG. 2 shows a typical structure of a wavelength division multiplexing fiber communication system in the prior art.
Figure 3:
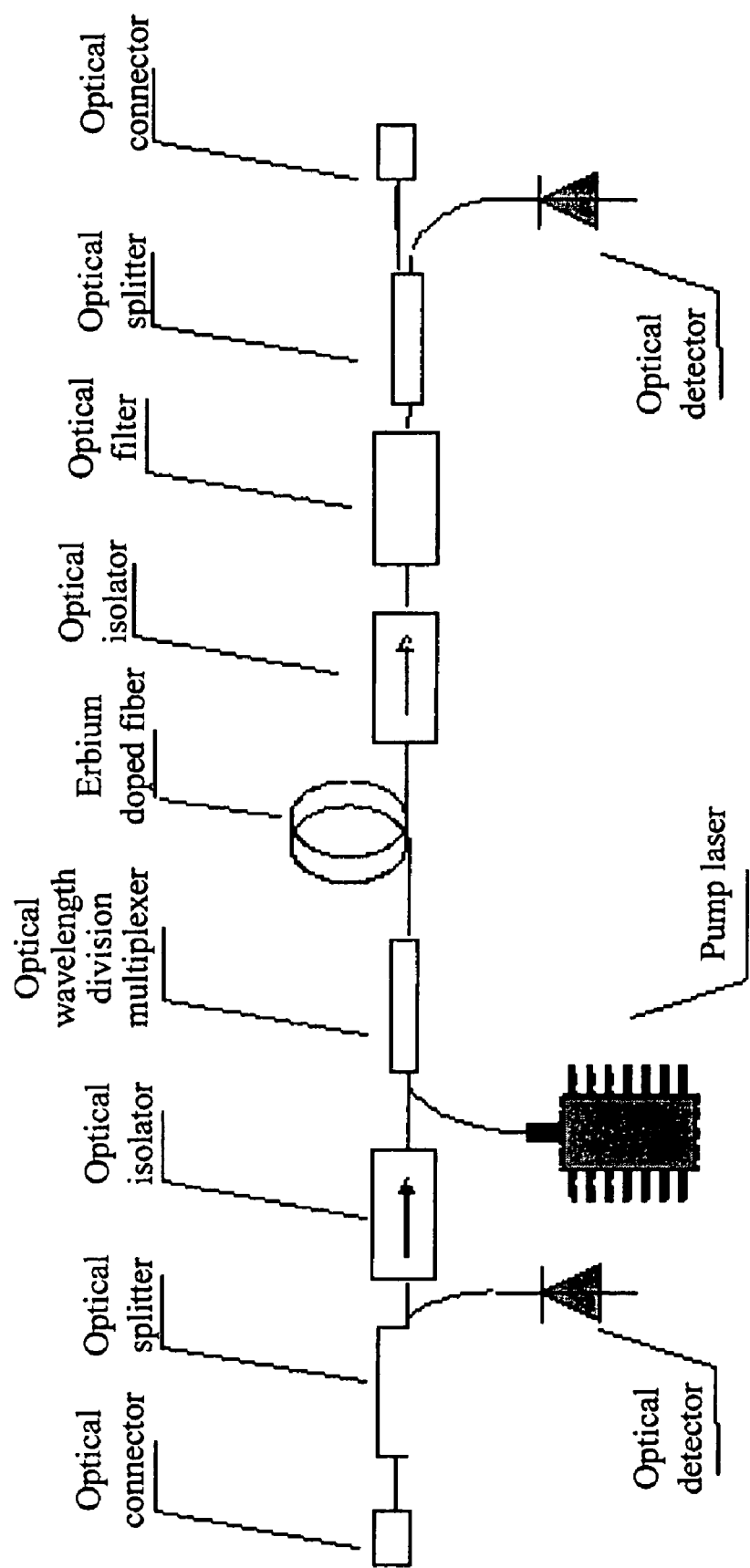
FIG. 3 shows a structure of an EDFA optical channel in the prior art.

A fiber communication system provided in some embodiments may be a single wavelength communication system or a wavelength division multiplexing communication system. These embodiments, for example, may be used in a wavelength division multiplexing communication system. FIG. 1 shows an exemplary structure of the wavelength division multiplexing communication system. The wavelength division multiplexing communication system includes at least an optical transmitter, at least an optical receiver, at least a transmission fiber, and the fiber amplifier described in the preceding embodiments.

The optical transmitter is adapted to transmit optical signals.

The optical receiver is adapted to receive optical signals.

The transmission fiber is adapted to carry optical signals.

The fiber amplifier is adapted to amplify optical signals, and includes at least a pump laser, at least a gain medium, and at least an integrated optical component. The integrated optical component includes multiple input/output ports, and the input/output ports are connected to the pump laser or gain medium directly or indirectly.

In summary, compared with the prior art, the compact fiber amplifier formed by the free space integrated optical component has the following merits:

1. Multiple optical components are integrated into a small-size component through the free space integration technology. Compared with discrete components or hybrid components under inline package, this may reduce the number of parts such as encapsulating parts and fiber collimators for some discrete components, thus reducing the size of the component. In addition, the fiber outlet may be designed flexibly in the free space integrated optical component, which may reduce the area of fiber winding. For example, a reflective structure may be designed so that the fiber can be led out in the same direction. Therefore, the fiber amplifier using this integrated component may be designed in a more compact structure.

2. Using the free space integrated component may reduce the number of optical components such as encapsulating parts and fiber collimators. This may also save the process of encapsulating some components, thus lowering the costs of the components. In addition, using the integrated component in a fiber amplifier may facilitate the assembly and reduce the number of fiber fusion splices, thus improving the processing efficiency. Therefore, the material and manufacturing costs of the fiber amplifier that uses the free space integrated optical component may be reduced, and the production cycle may be shortened.

3. Compared with the combination of discrete components, the free space integrated optical component may reduce the collimator coupling times, thus reducing losses of the components. In addition, the free space integrated optical component may reduce the number of fiber fusion splices, thus reducing the accumulated splicing loss and optical energy loss. This may increase the output power of the fiber amplifier and reduce the noise coefficient.

4. Compared with the combination of discrete components, the free space integrated optical component may reduce the number of components through which the optical energy passes and the number of fusion splices, thus improving the reliability of the fiber amplifier. Generally, the failure of fiber fusion splices is a main cause for the failure of a high power fiber amplifier. Thus, using the free space integrated optical component in a high power fiber amplifier may enhance the reliability.

The above are only preferred embodiments of the present invention, and are not meant to limit the scope of protection of the invention. It is apparent that those skilled in the art can make various modifications and variations to the invention without departing from the spirit and scope of the invention. The invention is intended to cover the modifications and variations provided that they fall in the scope of protection defined by the claims or their equivalents.

What is claimed is:

1. A fiber amplifier, comprising:
    at least a pump laser, at least a gain medium, and at least an integrated optical component, wherein the integrated optical component comprises multiple optical input/output ports, and the optical input/output ports are connected to the pump laser or gain medium directly or indirectly;
    wherein the integrated optical component comprises:
    an optical input port, comprising:
        a signal light input port, configured to input optical signals to be amplified;
        a pump light input port, configured to input pump light; and
        an active medium output port, configured to input amplified optical signals to the integrated optical component;
    and
    an optical output port, comprising:
        a signal light output port, configured to output amplified optical signals; and
        an active medium input port, configured to output optical signals to be amplified to a gain medium;
    wherein the integrated optical component further comprises:
    an optical splitter port, configured to split the input signal light, and output signal light and/or pump light;
    a polarization beam combiner port, configured to input combined polarization light signals;
    an optical detector output port, configured to convert optical signals into electrical signals; and
    an optical attenuator drive port, configured to drive the optical attenuator.

2. The fiber amplifier of claim 1, wherein the integrated optical component integrates multiple optical components on a two-dimensional or three-dimensional basis in a free space to implement interconnection between some or all optical components, the optical components comprise a fiber collimator, an optical splitter, an optical isolator, and an optical wavelength division multiplexer.

3. The fiber amplifier of claim 1, wherein the pump laser, the gain medium and the integrated optical component are connected in modes comprising:
    the pump laser is connected to the pump light input port of the integrated optical component;
    the gain medium is connected to the active medium input/output port of the integrated optical component;
    the gain medium is connected to the signal light input/output port through internal optical components of the integrated optical component; and
    the pump laser is connected to the active medium input/output port through internal optical components of the integrated optical component.

4. The fiber amplifier of claim 1, wherein when the gain medium is an erbium doped fiber (EDF), the integrated optical component comprises:
    an optical channel for processing optical signals to be amplified, wherein optical signals are input from the optical signal input port, and are converted into a parallel beam through a fiber collimator; an optical splitter splits some light to an optical detector to detect input optical power; light transmitted through the optical splitter passes through an optical isolator and an optical wavelength division multiplexer, and enters a second fiber collimator; the light is focused and coupled to the EDF input port for output; pump light is input through a third fiber collimator, and is reflected back to the second fiber collimator through the optical wavelength multiplexer; the pump light is focused and coupled to the EDF input port for output; after the optical signals and the pump light are focused and coupled at the EDF input port, amplified optical signals are output; or
    an optical channel for processing amplified optical signals: optical signals amplified in the erbium doped fiber are input from the EDF output port, and are converted into a parallel beam through a fiber collimator; the parallel beam passes through an optical isolator, an optical filter and an optical splitter in turn, and the optical splitter splits some light to the optical detector to detect output optical power; light transmitted through the optical splitter enters a second optical collimator, and is focused and coupled to the optical signal output port for output.

5. The fiber amplifier of claim 4, wherein if the second fiber collimator is a dual fiber collimator, the pump light is input from an input port of the dual fiber collimator and is output with the signal light from an output port of the dual fiber collimator.

6. The fiber amplifier of claim 1, wherein the gain medium comprises an erbium doped fiber (EDF) and the pump laser comprises a 980 nm band pump laser or a 1480 nm band pump laser.

7. A method for fabricating a fiber amplifier, comprising:
    integrating multiple optical components into an integrated optical component; and
    combining the integrated optical component, a pump laser, and a gain medium into a fiber amplifier;
    wherein when the gain medium is an erbium doped fiber (EDF), the integrated optical component comprises:
    an optical channel for processing optical signals to be amplified wherein optical signals are input from an optical signal input port, and are converted into a parallel beam through a fiber collimator; an optical splitter splits some light to an optical detector to detect input optical power; light transmitted through the optical splitter passes through an optical isolator and an optical wavelength division multiplexer, and enters a second fiber collimator; the light is focused and coupled to an EDF input port for output, pump light is input through a third fiber collimator, and is reflected back to the second fiber collimator through the optical wavelength multiplexer; the pump light is focused and coupled to the EDF input port for output; after the optical signals and the pump light are focused and coupled at the EDF input port, amplified optical signals are output; and/or
    an optical channel for processing amplified optical signals, wherein optical signals amplified in the erbium doped fiber are input from an EDF output port, and are converted into a parallel beam through a fiber collimator; the parallel beam passes through an optical isolator, an optical filter and an optical splitter in turn, and the optical splitter splits some light to the optical detector to detect output optical power; light transmitted through the optical splitter enters a second optical collimator, and is focused and coupled to an optical signal output port for output.

8. The method of claim 7, wherein the method for integrating multiple optical components into an integrated optical component comprises:
   integrating a fiber collimator, an optical splitter, an optical isolator, and an optical wavelength division multiplexer on a two-dimensional or three-dimensional basis in a free space; and configuring a signal light input/output port, a pump light input port, and an active medium input/output port to form the integrated optical component.

9. The method of claim 8, wherein the pump laser, the gain medium and the integrated optical component are connected in modes comprising:
   the pump laser is connected to the pump light input port of the integrated optical component;
   the gain medium is connected to the active medium input/output port of the integrated optical component;
   the gain medium is connected to the signal light input/output port through internal optical components of the integrated optical component; and
   the pump laser is connected to the active medium input/output port through internal optical components of the integrated optical component.

10. The method of claim 7, wherein the gain medium comprises an erbium doped fiber (EDF) and the pump laser comprises a 980 nm band pump laser and/or a 1480 nm band pump laser.

11. A fiber communication system, comprising at least an optical transmitter, at least an optical receiver, at least a transmission fiber, and a fiber amplifier, wherein:
   the optical transmitter is adapted to transmit optical signals;
   the optical receiver is adapted to receive optical signals;
   the transmission fiber is adapted to carry optical signals; and
   the fiber amplifier is adapted to amplify optical signals in the transmission fiber, and comprises at least a pump laser, at least a gain medium and at least an integrated optical component, where the integrated optical component comprises multiple optical input/output ports, and the optical input/output ports are connected to the pump laser or gain medium directly or indirectly;
   wherein the integrated optical component comprises:
   an optical input port, comprising:
      a signal light input port, adapted to input optical signals to be amplified:
      a pump light input port, adapted to input pump light; and
      an active medium output port, adapted to amplified optical signals to the integrated optical component;
   and
   an optical output port, comprising:
      a signal light output port, adapted to output amplified optical signals; and
      an active medium input port, adapted to output optical signals to be amplified to the gain medium;
   wherein the integrated optical component further comprises:
   an optical splitter port, configured to split the input signal light, and output signal light and/or pump light;
   a polarization beam combiner port, configured to input combined polarization light signals;
   an optical detector output port, configured to convert optical signals into electrical signals; and
   an optical attenuator drive port, configured to drive the optical attenuator.

* * * * *